(12) United States Patent
Takahashi

(10) Patent No.: US 7,061,983 B2
(45) Date of Patent: Jun. 13, 2006

(54) DATA CODING METHOD AND DATA CODING DEVICE

(75) Inventor: Tetsu Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/756,256

(22) Filed: Jan. 14, 2004

(65) Prior Publication Data
US 2004/0190608 A1    Sep. 30, 2004

(30) Foreign Application Priority Data
Mar. 28, 2003    (JP) .............. 2003-089912

(51) Int. Cl.
*H04N 7/12*    (2006.01)
(52) U.S. Cl. .................. 375/240.26
(58) Field of Classification Search ......... 375/240.02, 375/240.26; 386/47, 91; 725/94–95; 705/136; 348/512, 515
See application file for complete search history.

(56) References Cited

U.S. PATENT DOCUMENTS

| | | | | |
|---|---|---|---|---|
| 5,543,853 A | * | 8/1996 | Haskell et al. ......... | 375/240.28 |
| 5,751,887 A | * | 5/1998 | Nitta et al. ........... | 386/68 |
| 5,982,447 A | * | 11/1999 | Nakamura ............ | 348/515 |
| 6,212,208 B1 | * | 4/2001 | Yoneda et al. ........ | 370/538 |
| 6,542,564 B1 | * | 4/2003 | Cho ...................... | 375/372 |
| 2001/0031136 A1 | * | 10/2001 | Kawamura et al. .... | 386/98 |

FOREIGN PATENT DOCUMENTS

| | | |
|---|---|---|
| JP | 08-130715 | 5/1996 |
| JP | 08-223538 | 8/1996 |

* cited by examiner

*Primary Examiner*—Vu Le
(74) *Attorney, Agent, or Firm*—Arent Fox PLLC

(57) ABSTRACT

The coding processing is suspended when at least one of the first to third buffers store(s) therein data of amount exceeding its/their respective maximum amount(s). The coding processing is restarted when at least one of the first to third buffers store(s) therein data of amount below its/their respective reference amount(s) which is/are set to smaller values than the maximum amounts, respectively. This enables prevention of overflow of the first and second buffers. This can also prevent unread data from being overwritten in the first and second buffers, so that generation of not normal multiplexed data can be prevented. Accordingly, the output of erroneous multiplexed data can be prevented.

16 Claims, 7 Drawing Sheets

DATA CODING METHOD AND DATA CODING DEVICE

CROSS-REFERENCE TO RELATED APPLICATIONS

This application is based upon and claims the benefit of priority from Japanese Patent Application No. 2003-089912, filed on Mar. 28, 2003, the entire contents of which are incorporated herein by reference.

BACKGROUND OF THE INVENTION

1. Field of the Invention

The present invention relates to a data coding method and a data coding device for coding video data and audio data according to the MPEG (Moving Picture Expert Group) standard.

2. Description of the Related Art

In recent years, there has been developed of a video recorder that codes video data and audio data according to the MPEG standard for data recording on a recording medium such as a DVD (Digital Versatile Disk) and a hard disk.

A data coding LSI mounted on the video recorder has an MPEG encoder for coding (encoding), for example, video data and audio data according to the MPEG standard. The MPEG encoder has a video encoder, a video ring buffer, an audio encoder, an audio ring buffer, a multiplexer, and a system ring buffer.

The video encoder encodes ITU-R656 video data in the MPEG2 video MP@ML format and writes the resultant data to the video ring buffer as PES (Packetized Elementary Stream) data.

The audio encoder encodes 12S audio data in the MPEG1 Audio Layer 2 format and writes the resultant data to the audio ring buffer as PES data.

The multiplexer multiplexes PES data read from the video ring buffer and PES data read from the audio ring buffer at predetermined timing to write the resultant data to the system ring buffer as a data stream of the MPEG2 system PS format. Note that the multiplexer multiplexes the data only when judging that it can write a new data stream to a third buffer.

In response to the activation of a stream output request signal supplied from an external device, the system ring buffer outputs an 8-bit parallel data stream to the external device together with a synchronous clock, a stream output enable signal, and so on.

Further, Japanese Unexamined Patent Application Publication Nos. Hei 8-130715 and Hei 8-223538, for example, have proposed a ring buffer control method for realizing reverse direction reproduction in an MPEG decoder for decoding (reproducing) data that are coded according to the MEPG standard.

SUMMARY OF THE INVENTION

In the data coding LSI as described above, when the deactivation period of the stream output request signal is long, data streams are not output from the system ring buffer and accordingly continuously accumulated therein. This sometimes causes the multiplexer to stop the multiplexing, because it judges that it cannot write a new data stream to the third buffer even if generating it. Also, data can be read neither from the video ring buffer nor from the audio ring buffer, which causes continuous data accumulation therein.

This may cause at least either one of the video ring buffer and the audio ring buffer to overflow. Specifically, in at least either one of the video ring buffer and the audio ring buffer, unread data are overwritten with newly generated data. As a result, the multiplexer cannot know the multiplexing timing and where data to be multiplexed is positioned in the video ring buffer and in the audio ring buffer. Therefore, the multiplexer is unable to normally generate the data streams. In other words, erroneous data streams are outputted from the system ring buffer.

According to one of the aspects of the present invention, first, video data is coded according to a first standard to generate video coding data. The video coding data is written to a first buffer. Further, audio data is coded according to a second standard to generate audio coding data. The audio coding data is written to a second buffer. Next, the data read from the first and second buffers are multiplexed at predetermined timing according to a third standard to generate multiplexed data. The multiplexed data is written to a third buffer. Then, the written multiplexed data is outputted in response to an external request. The first to third maximum amounts of data and the first to third reference amounts are set for the first to third buffers, respectively. The first to third reference amounts are smaller than the first to third maximum amounts, respectively. The coding processing is suspended when at least one of the first to third buffers store(s) therein data of amount exceeding its/their respective maximum amount(s) during the above-described processing. The coding processing is restarted when at least one of the first to third buffers store(s) therein data of amount below its/their respective reference amount(s).

A data coding device to which the present invention is applied has: a video encoder that outputs video coding data generated in the above-described manner; a first buffer; an audio encoder that outputs audio coding data generated in the above-described manner; a second buffer; a multiplexer that outputs multiplexed data generated in the above-described manner; a third buffer that outputs written multiplexed data in response to an external request; and a controlling part that controls coding and multiplexing in the above described manner.

Suspending the coding processing when at least one of the first to third buffers store(s) data of amounts exceeding the respective maximum amounts enables the prevention of the overflow of the first and second buffers. Moreover, this can prevent unread data from being overwritten in the first and second buffers, which makes it possible to prevent generation of not normal multiplexed data. In other words, the output of erroneous multiplexed data can be prevented.

According to another aspect of the present invention, a capacity of the first buffer is equal to or larger than a sum of the first maximum amount and a maximum amount of data written to the first buffer during a period from when the coding processing suspends to when the coding of the video data actually stops. A capacity of the second buffer is equal to or larger than a sum of the second maximum amount and a maximum amount of data written to the second buffer during a period from when the coding processing suspends to when the coding of the audio data actually stops. A capacity of the third buffer is equal to or larger than a sum of the third maximum amount and a maximum amount of data written to the third buffer during a period from when the coding processing suspends to when the coding of the video data and the audio data actually stops.

This makes it possible to surely write to the first buffer the video coding data generated during the period from the suspension of the coding processing to the actual stop of the coding of the video data. It is also possible to surely write to the second buffer the audio coding data generated during the period from the suspension of the coding processing to the actual stop of the coding of the audio data. Similarly, it is possible to surely write to the third buffer the multiplexed data generated during the period from the suspension of the coding processing to the actual stop of the coding of the video data and the audio data. As a result, the overflow of the first and second buffers can be prevented even if data are written to the first to third buffers after the coding processing is suspended.

According to another aspect of the present invention, when amounts of data stored in the third buffer and at least either of the first and second buffers exceed their respective maximum amounts, unread multiplexed data in the third buffer are overwritten with newly generated multiplexed data in sequence. The overwriting is done in such a manner that the older multiplexed data is, the earlier it is overwritten.

Permitting the overwrite to the multiplexed data in the third buffer allows the multiplexer to continue the multiplexing even after the amount of data stored in the third buffer exceeds the third maximum amount. Therefore, the first and second buffers are able to keep outputting data even after the amount of data stored in the third buffer exceeds the third maximum amount. This can prevent the overflow of the first and second buffers.

Since the unread data are prevented from being overwritten in the first and second buffers, generation of not normal multiplexed data can be also prevented. In other words, the output of erroneous multiplexed data can be prevented.

Overwriting the multiplexed data in the third buffer results in temporarily discontinuing continuity of the multiplexed data outputted therefrom. However, owing to normal multiplexed data stored therein, the multiplexed data can be outputted from the third buffer without any special control performed, upon issuance of an external request at a predetermined rate.

According to another aspect of the present invention, when amounts of data stored in the first and third buffers exceed the first and third maximum amounts, respectively, unread video coding data in the first buffer are overwritten with newly generated video coding data in sequence. The overwriting is done in such a manner that the older video coding data is, the earlier it is overwritten. When amounts of data stored in the third buffer and the second buffer exceed the third maximum amount and the second maximum amount, respectively, unread audio coding data in the second buffer are overwritten with newly generated audio coding data in sequence. The overwriting is done in such manner that the older audio coding data is, the earlier it is overwritten.

Permitting the overwrite to the video coding data (or audio coding data) is in the first buffer (or the second buffer) makes it possible to continue to code the video data (or audio data) even after the amount of data stored in the first buffer (or second buffer) exceeds the first maximum amount (or the second maximum amount).

Further, when part of video coding data (or audio coding data) is erased by overwriting, for example, audio coding data (or video coding data) corresponding to the erased video coding data (or audio coding data) is also erased. This enables the multiplexer to properly identify which video coding data and audio coding data it should multiplex, even when the data overwrite is executed in the first or the second buffer. As a result, similarly to the prevention of the overflow from the first and second buffers, generation of not normal multiplexed data can be prevented. In other words, the output of erroneous multiplexed data can be prevented.

According to another aspect of the present invention, the first to third standards are an MPEG standard. The MPEG standard is a main standard for coding video data and audio data. Therefore, the present invention is applicable to various applications in which data is coded according to the MPEG standard.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be explained, using the drawings.

Figure 1:
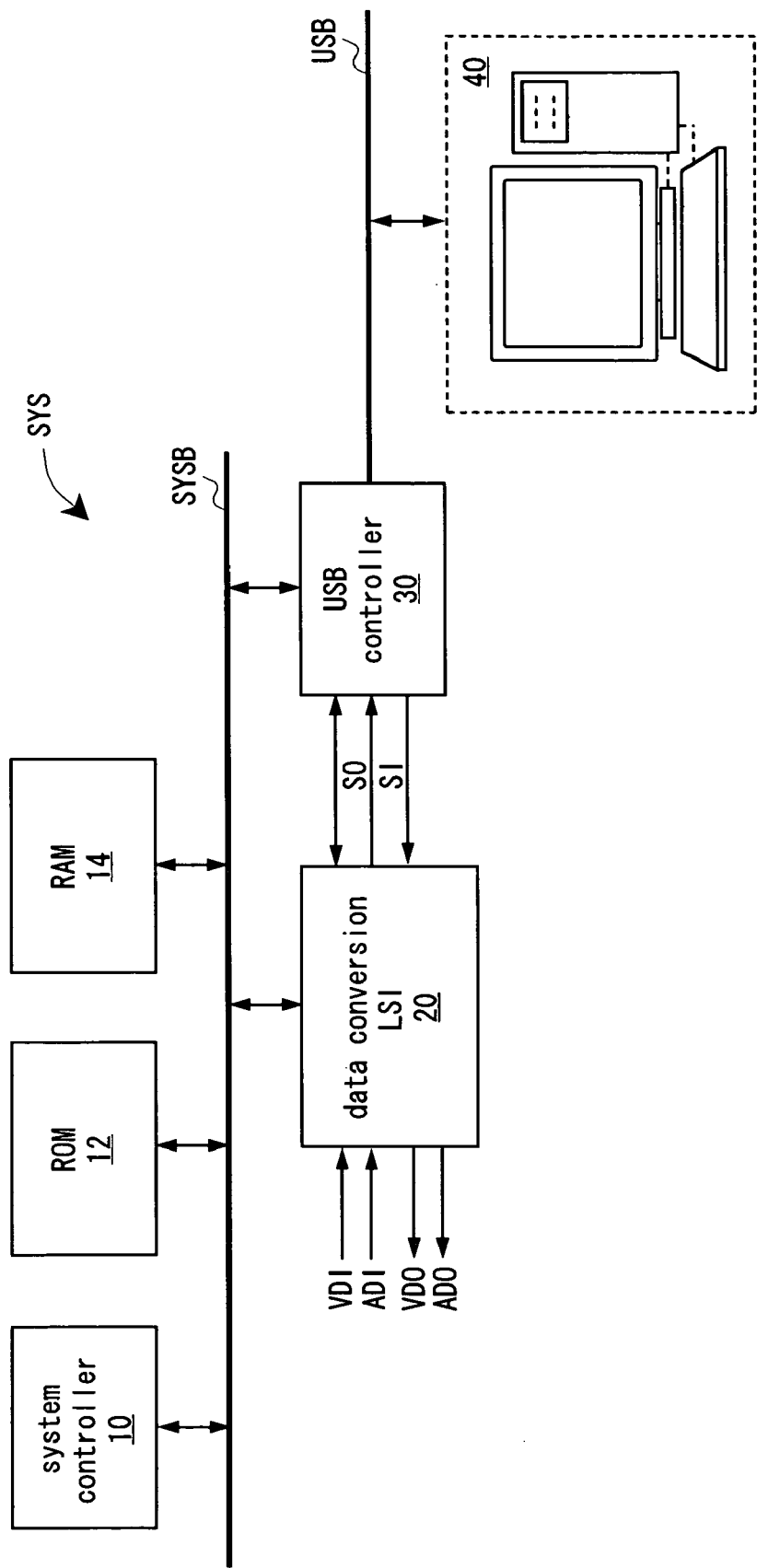
FIG. 1 is a block diagram showing a first embodiment of the present invention.

FIG. 1 shows a first embodiment of the present invention. The present invention is applied to a data conversion LSI 20 of a video recording system SYS.

The video recording system SYS is composed of a system controller 10, a ROM 12, a RAM 14, the data conversion LSI 20, a USB (Universal Serial Bus) controller 30, a personal computer 40, a system bus SYSB, and a universal serial bus USB. The system controller 10, the ROM 12, the RAM 14, the data conversion LSI 20, and the USB controller 30 are mounted on a substrate that constitutes, for example, a video recording system.

The system controller 10 controls each of the components according to programs stored in the ROM 12 and executes various kinds of arithmetic operations. The RAM 14 temporarily stores therein programs to be executed by the system controller 10 and data under the arithmetic operation. The bus SYSB connects the system controller 10, the ROM 12, the RAM 14, the data conversion LSI 20, and the USB controller 30 to one another to enable data exchange thereamong.

The data conversion LSI 20 converts ITU-R656 video data VDI and 12S audio data ADI to output a data stream SO of the MPEG2 system PS format to the USB controller 30. The data conversion LSI 20 converts a data stream SI of the MPEG2 system PS format supplied from the USB controller 30 to output ITU-R656 video data VDO and 12S audio data ADO. The data conversion LS1 20 will be explained in detail in FIG. 2.

The USB controller 30, which functions as an interface of the bus USB, outputs to the personal computer 40 a data stream supplied from the data conversion LS1 20 and outputs to the data conversion LSI 20 a data stream supplied from the personal computer 40. The personal computer 40 exchanges the data streams with the USB controller 30 via the bus USB.

Figure 2:
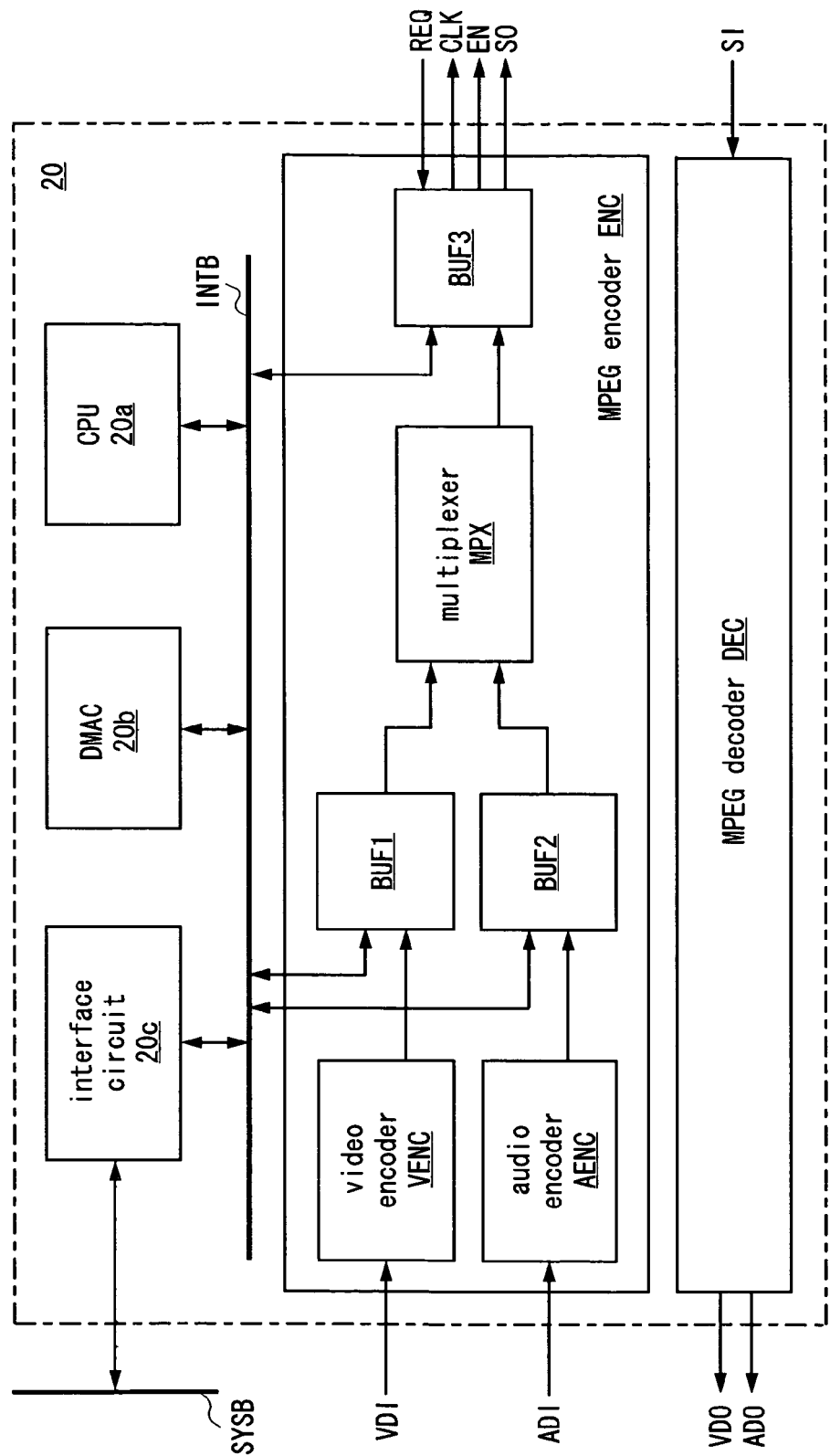
FIG. 2 is a block diagram showing an example of a data conversion LSI in the first embodiment.

FIG. 2 shows an example of the data conversion LSI 20 in the first embodiment.

The data conversion LS1 20 has a CPU 20a (controlling part), a DMAC (Direct Memory Access Controller) 20b, an interface circuit 20c, an MPEG encoder ENC, an MPEG decoder DEC, and an internal bus INTB.

The system controller 10 obtains firmware for the data conversion LSI 20 stored in the ROM 12 via the bus SYSB to store the firmware in a predetermined area of the RAM 14. The CPU 20a operates according to the firmware thus stored in the RAM 14. The DMAC 20b exchanges data directly, not via the CPU 20a, with the RAM 14. The interface circuit 20c mainly functions as an interface for data exchange with the RAM 14. The bus INTB connects the CPU 20a, the DMAC 20b, the interface circuit 20c, ring buffers (a video ring buffer BUF1, an audio ring buffer BUF2, and a system ring buffer BUF3) in the MPEG encoder ENC, and ring buffers (not shown) in the MPEG decoder DEC to one another to enable data exchange thereamong.

The MPEG encoder ENC has a video encoder VENC, the video ring buffer BUF1 (first buffer), an audio encoder AENC, the audio ring buffer BUF2 (second buffer), a multiplexer MPX, and the system ring buffer BUF3 (third buffer).

The video encoder VENC encodes the ITU-R656 video data VDI in the MPEG2 video MP@ML format and writes the resultant data to the video ring buffer BUF1 as PES data (video coding data). The audio encoder AENC encodes the 12S audio data ADI in the MPEG1 Audio Layer 2 format and writes the resultant data to the audio ring buffer BUF2 as PES data (audio coding data).

The multiplexer MPX multiplexes PES data read from the video ring buffer BUF1 and PES data read from the audio ring buffer BUF2 at predetermined timing to write the resultant data to the system ring buffer BUF3 as the data stream (multiplexed data) of the MPEG2 system PS format. Note that the multiplexer MPX executes the multiplexing only when judging that it can write a new data stream to the system ring buffer BUF3.

In response to the activation of a stream output request signal REQ supplied from the USB controller 30, the system ring buffer BUF3 outputs a synchronous clock CLK, a stream output enable signal EN, and the 8-bit parallel data stream SO to the USB controller 30.

Note that in response to a read request, the video ring buffer BUF1, the audio ring buffer BUF2, and the system ring buffer BUF3 output the stored data in sequence, starting from data that has been written first. This means that the video ring buffer BUF1, the audio ring buffer BUF2, and the system ring buffer BUF3 operate as FIFO (First In First Out) buffers.

The MPEG decoder DEC decodes the data stream SI of the MPEG2 system PS format supplied from the USB controller 30 to output the ITU-R656 video data VDO and the 12S audio data ADO.

Figure 3:
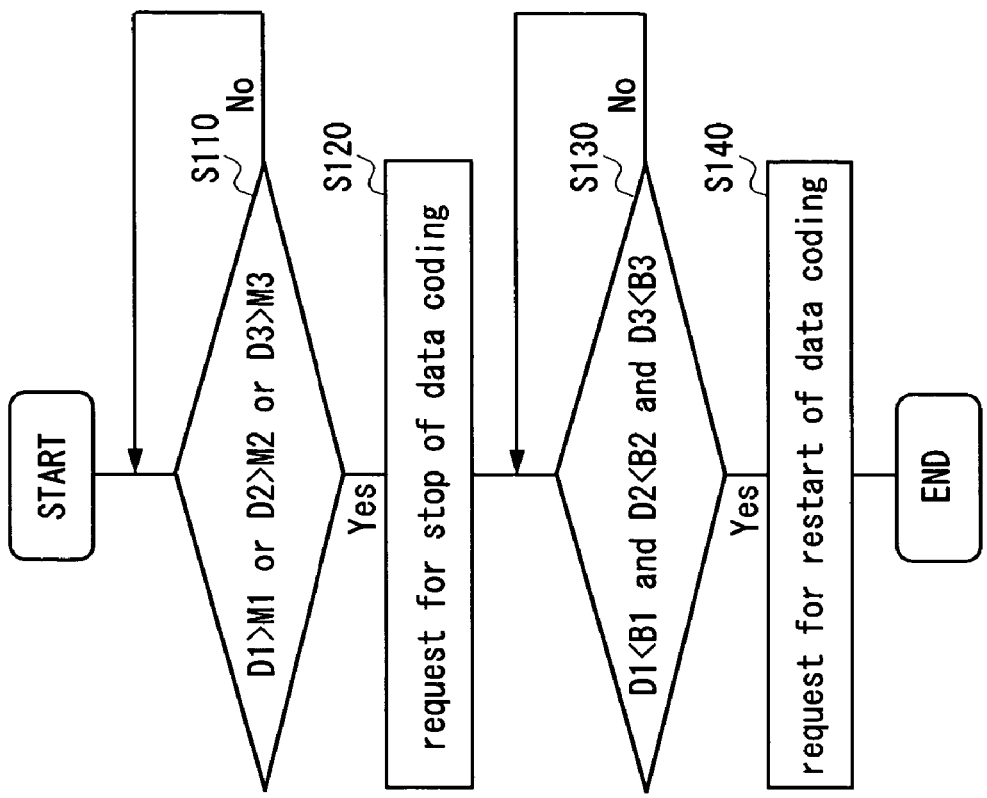
FIG. 3 is a flowchart showing the operation of a buffer control processing of an MPEG encoder in the first embodiment.

FIG. 3 shows the operation of a buffer control processing of the MPEG encoder ENC in the first embodiment.

The buffer control processing is executed by the CPU 20a according to the firmware stored in the RAM 14. The CPU 20a repeats the following operation while the video data VDI and the audio data ADI are being encoded.

In Step S110, the CPU 20a monitors amounts D1, D2, D3 of data stored in the video ring buffer BUF1, the audio ring buffer BUF2, and the system ring buffer BUF3 respectively. For example, the video ring buffer BUF1 has a write pointer and a read pointer, and the CPU 20a calculates the data amount D1, using a value of the write pointer and a value of the read pointer which are transferred by the DMAC 20b. Similarly, the CPU 20a calculates the data amounts D2, D3 as well.

When the data amount D1 exceeds a first maximum amount M1 set for the video ring buffer BUF1, or when the data amount D2 exceeds a second maximum amount M2 set for the audio ring buffer BUF2, or when the data amount D3 exceeds a third maximum amount M3 set for the system ring buffer BUF3, the processing shifts to Step S120. If this condition is not satisfied, the CPU 20a continues to monitor the data amounts D1, D2, D3.

In Step S120, the CPU 20a stops the coding processing, in other words, requests the video encoder VENC and the audio encoder AENC to stop the coding. This prevents the overflow of the video ring buffer BUF1 and the audio ring buffer BUF2. Thereafter, the processing shifts to Step S130.

Note that the capacity of the video ring buffer BUF1 is equal to or larger than the sum of the first maximum amount MI and the maximum amount of data written to the video ring buffer BUF1 during a period from the CPU 20a's request for stop of the coding to the actual stop of coding of the video data VDI. For example, the capacity of the video ring buffer BUF1 is 256 kbyte and the maximum amount of data written to the video ring buffer BUF1 during the period from the CPU 20a's request for stop of the coding to the actual stop of coding of the video data VDI is 27 kbyte. Therefore, setting the first maximum amount to 229 kbyte or smaller in advance makes it possible to surely prevent the overflow of the video ring buffer BUF1.

The capacity of the audio ring buffer BUF2 is equal to or larger than the sum of the second maximum amount M2 and the maximum amount of data written to the audio ring buffer BUF2 during a period from the CPU 20a's request for stop of the coding to the actual stop of coding of the audio data ADI.

Similarly, the capacity of the system ring buffer BUF3 is equal to or larger than the sum of the third maximum amount M3 and the maximum amount of data written to the system ring buffer BUF3 during a period from the CPU 20a's request for stop of the coding to the actual stop of coding of the video data VDI and the audio data ADI.

In Step S130, the CPU 20a monitors the data amounts D1, D2, D3 again. When all of the data amounts D1, D2, D3 become smaller than a first reference amount B1, a second reference amount B2, and a third reference amount B3 respectively, the processing shifts to Step S140. Here, the first reference amount B1, the second reference amount B2, and the third reference amount B3 are set for the video ring buffer BUF1, the audio ring buffer BUF2, and the system ring buffer BUF3 to smaller values than the first maximum amount M1, the second maximum amount M2, and the third maximum amount M3, respectively. If this condition is not satisfied, the CPU 20a continues to monitor the data amounts D1, D2, D3.

In Step S140, the CPU 20a restarts the coding processing, in other words, requests the video encoder VENC and the audio encoder AENC to restart the coding. This completes the processing for preventing the overflow of the video ring buffer BUF1 and the audio ring buffer BUF2.

In the first embodiment described above, the following effects are obtainable.

Stopping the coding processing when at least one of the data amounts D1, D2, D3 exceed(s) respective maximum amount(s) of the first to third maximum amounts M1, M2, and M3 enables the prevention of the overflow of the video ring buffer BUF1 and the audio ring buffer BUF2. Moreover, this can prevent unread data from being overwritten in the video ring buffer BUF1 and the audio ring buffer BUF2, which makes it possible to prevent generation of not normal data streams. In other words, the output of erroneous data streams can be prevented.

Data generated after the CPU 20*a*'s coding stop request can be surely written to the video ring buffer BUF1, the audio ring buffer BUF2, and the system ring buffer BUF3 respectively. This makes it possible to prevent the overflow of the video ring buffer BUF1 and the audio ring buffer BUF2 even when the data write continues thereto after the CPU 20*a*'s issuance of the coding stop request.

Figure 4:
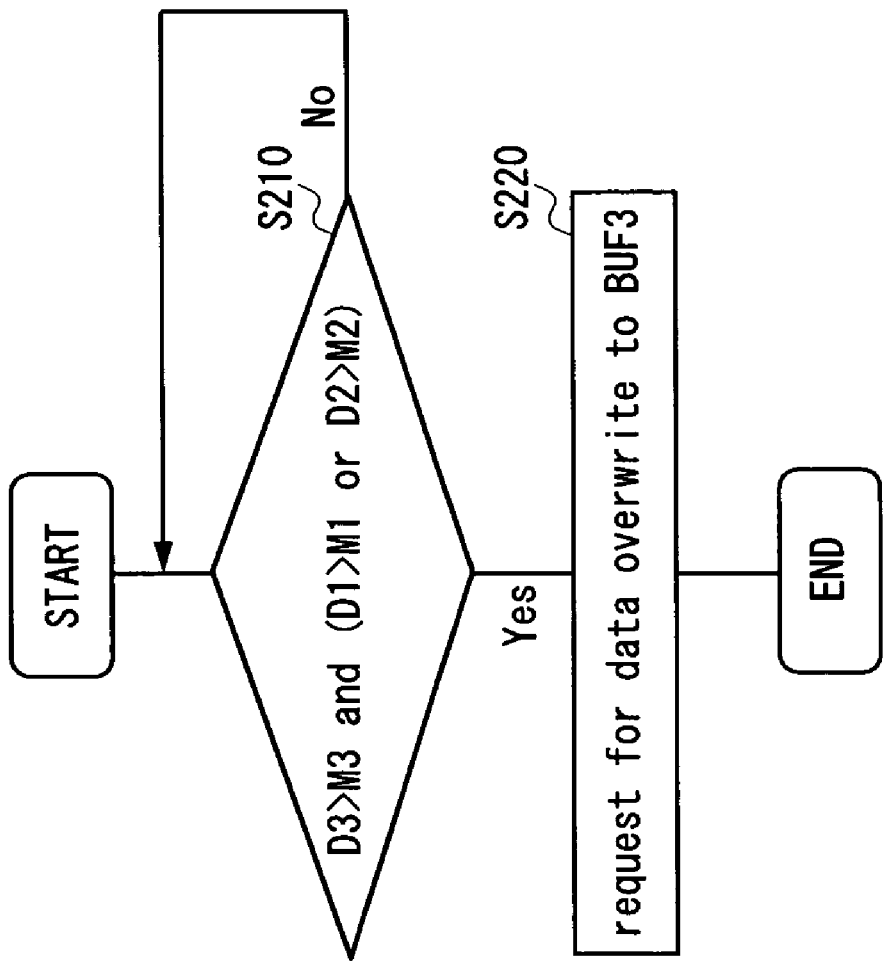
FIG. 4 is a flowchart showing a second embodiment of the present invention.

FIG. 4 shows the operation of a buffer control processing of an MPEG encoder ENC in a second embodiment. A video recording system in this embodiment is the same as that in the first embodiment (FIG. 1) except that firmware for a data conversion LSI 20 stored in a ROM 12 is different. The same reference numerals and symbols are used to designate the same elements as those explained in the first embodiment, and detailed explanation thereof will be omitted.

The buffer control processing is executed by a CPU 20*a* according to the firmware stored in the RAM 14, similarly to the first embodiment. The CPU 20*a* repeats the following operation while video data VDI and audio data ADI are being encoded.

In Step S210, the CPU 20*a* monitors data amounts D1, D2, D3. When the data amount D3 exceeds a third maximum amount M3 and the data amount D1 exceeds a first maximum amount M1, or when the data amount D3 exceeds the third maximum amount M3 and the data amount D2 exceeds a second maximum amount M2, the processing shifts to Step S220. if this condition is not satisfied, the CPU 20*a* continues to monitor the data amounts D1, D2, D3.

In Step S220, the CPU 20*a* requests a multiplexer MPX to overwrite data in a system ring buffer BUF3. The multiplexer MPX overwrites unread data streams in the system ring buffer BUF3 with a newly generated data stream in sequence, starting from the oldest data stream.

The data stream overwrite is permitted in the system ring buffer BUF3, so that the multiplexer MPX can continue its operation even after the data amount D3 exceeds the third maximum amount M3. In other words, a video ring buffer BUF1 and an audio ring buffer BUF2 keep outputting data even after the data amount D3 exceeds the third maximum amount M3. This prevents the overflow of the video ring buffer BUF1 and the audio ring buffer BUF2. Here, the processing for preventing the overflow of the video ring buffer BUF1 and the audio ring buffer BUF2 is completed.

In the second embodiment described above, the same effects as those in the first embodiment are obtainable. Moreover, overwriting the data streams in the system ring buffer BUF3 results in temporarily discontinuing continuity of a data stream SO outputted from the system ring buffer BUF3. However, owing to a normal data stream stored therein, the data stream can be output from the system ring buffer BUF3 without any special control performed, upon activation of a stream output request signal REQ at a predetermined rate.

Figure 5:
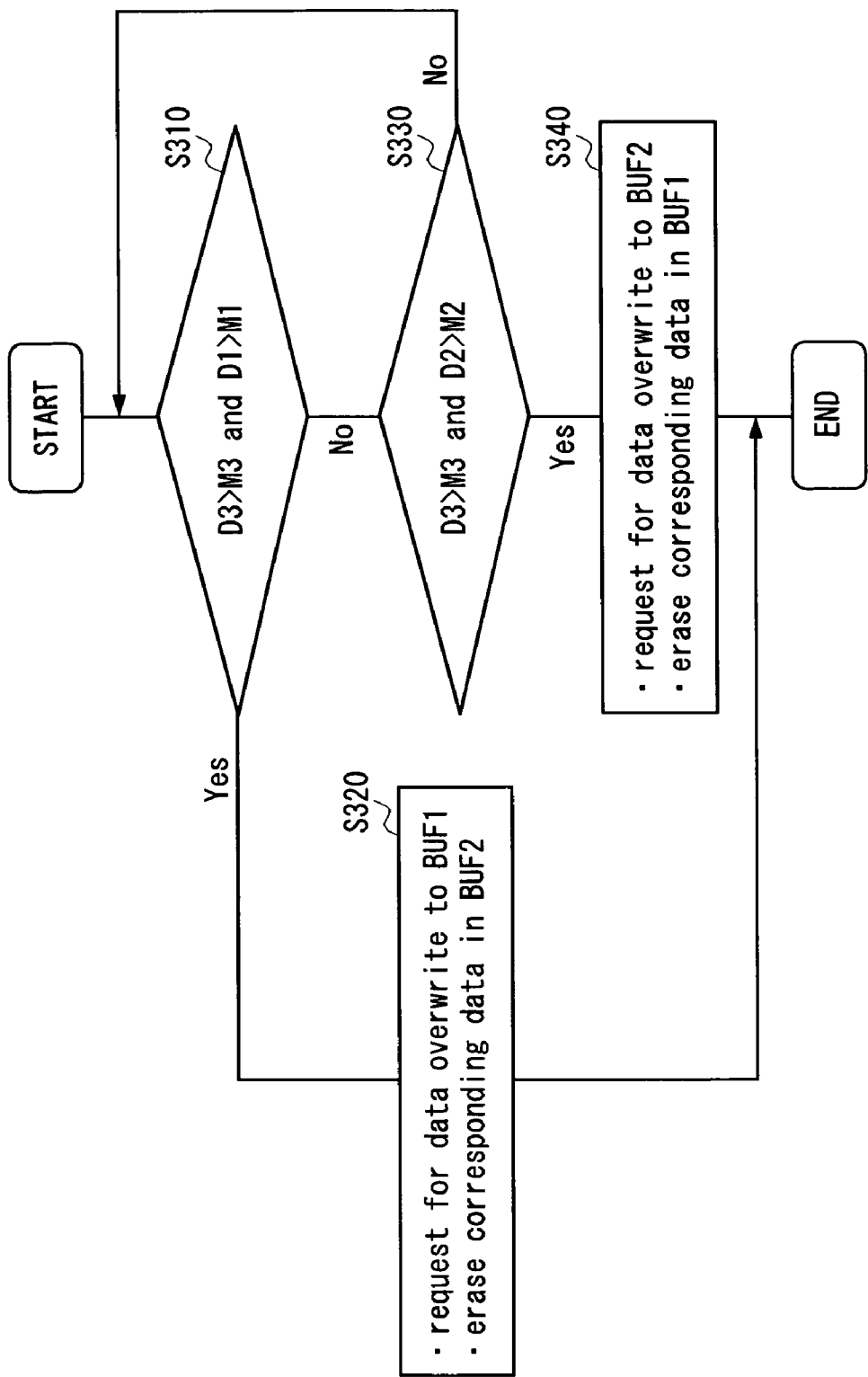
FIG. 5 is a flowchart showing a third embodiment of the present invention.

FIG. 5 shows the operation of a buffer control processing of an MPEG encoder ENC in a third embodiment. A video recording system in this embodiment is the same as that in the first embodiment (FIG. 1) except that firmware for a data conversion LSI 20 stored in a ROM 12 is different. The same reference numerals and symbols are used to designate the same elements as those explained in the first embodiment, and detailed explanation thereof will be omitted.

The buffer control processing is executed by a CPU 20*a* according to the firmware stored in the RAM 14, similarly to the first embodiment. The CPU 20*a* repeats the following operation while video data VDI and audio data ADI are being encoded.

In Step S310, the CPU 20*a* monitors data amounts D1, D3. When the data amount D3 exceeds a third maximum amount M3 and the data amount D1 exceeds a first maximum amount M1, the processing shifts to Step S320. If this condition is not satisfied, the processing shifts to Step S330.

In Step S320, the CPU 20*a* requests a video encoder VENC to overwrite data in a video ring buffer BUF1. The video encoder VENC overwrites unread data in the video ring buffer BUF1 with newly generated data in sequence, starting from the oldest data. The CPU 20*a* erases data in an audio ring buffer BUF2 corresponding to the overwritten data in the video ring buffer BUF1.

When part of data in the video ring buffer BUF1 is erased by the overwrite, data in the audio ring buffer BUF2 corresponding to the erased data is also erased. Therefore, the data outputted from the video ring buffer BUF1 and the data outputted from the audio ring buffer BUF2 correspond to each other even with the data overwrite in the video ring buffer BUF1. This allows a multiplexer MPX to properly identify which data in the video ring buffer BUF1 and in the audio ring buffer BUF2 it is to multiplex. As a result, it is possible to prevent generation of not normal data streams, similarly to the prevention of the overflow of the video ring buffer BUF1 and the audio ring buffer BUF2. Here, the processing for preventing generation of not normal data streams is completed.

In Step 330, the CPU 20*a* monitors a data amount D2 and the data amount D3. When the data amount D3 exceeds the third maximum amount M3 and the data amount D2 exceeds a second maximum amount M2, the processing shifts to Step S340. If this condition is not satisfied, the processing shifts to Step S310.

In Step S340, the CPU 20*a* requests an audio encoder AENC to overwrite data in the audio ring buffer BUF2. The audio encoder AENC overwrites unread data in the audio ring buffer BUF2 with newly generated data in sequence, starting from the oldest data. The CPU 20*a* erases data in the video ring buffer BUF1 corresponding to the overwritten data in the audio ring buffer BUF2.

When part of data in the audio ring buffer BUF2 is erased by the overwrite, data in the video ring buffer BUF1 corresponding to the erased data is also erased. Therefore, the data outputted from the video ring buffer BUF1 and the data outputted from the audio ring buffer BUF2 corresponds to each other even with the data overwrite in the audio ring buffer BUF2.

This allows the multiplexer MPX to properly identify which data in the video ring buffer BUF1 and data in the audio ring buffer BUF2 are to be multiplexed. As a result, similarly to the prevention of the overflow of the video ring buffer BUF1 and the audio ring buffer BUF2, it is possible to prevent generation of not normal data streams. Here, the processing for preventing generation of not normal data streams is completed.

In the third embodiment described above, the same effects as those in the first embodiment are obtainable.

Figure 6:
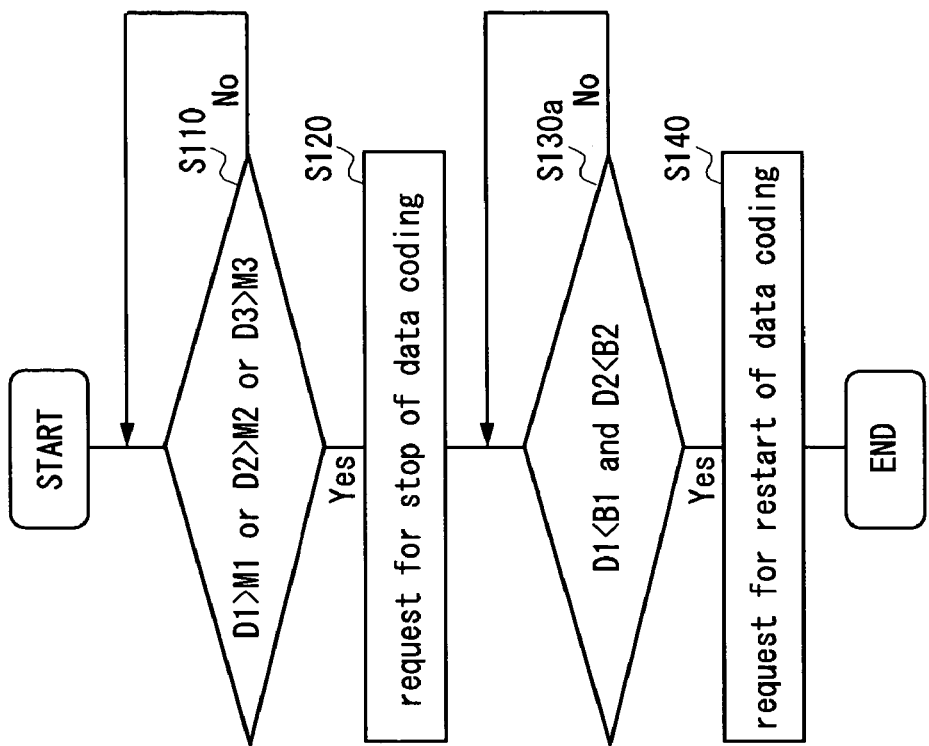
FIG. 6 is a flowchart showing a fourth operation example of the buffer control processing in the MPEG encoder.

Note that in the first embodiment, the description is given on the example where the coding processing is restarted when all of the data amounts D1, D2, D3 become smaller than the first reference amount B1, the second reference amount B2, and the third reference amount B3, respectively. The present invention is not to be limited to such an embodiment. For example, as shown in FIG. 6, the coding processing may be restarted when both of the data amounts D1, D2 become smaller than the first reference amount B1 and the second reference amount B2 respectively. The condition for restarting the coding processing is to be such that both of the data amounts D1, D3 are smaller than the first reference amount B1 and the third reference amount B3 respectively or that both of the data amounts D2, D3 are smaller than the second reference amount B2 and the third reference amount B3 respectively.

Figure 7:
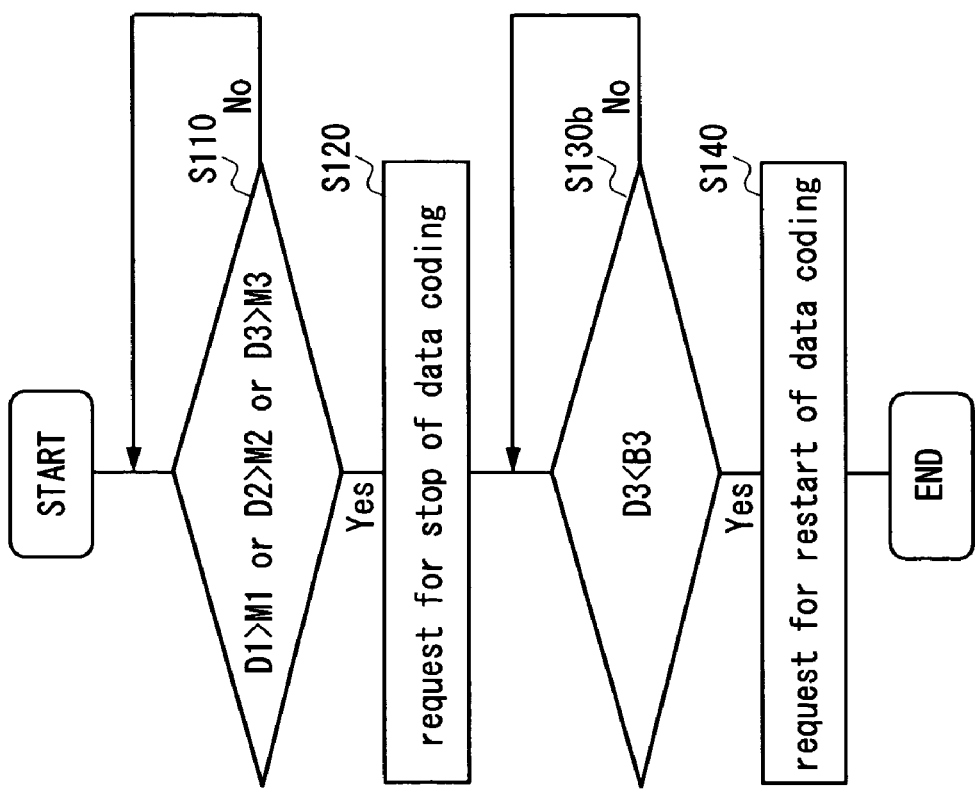
FIG. 7 is a flowchart showing a fifth operation example of the buffer control processing in the MPEG encoder.

Alternatively, for example, as shown in FIG. 7, the coding processing may be restarted when the data amount D3 becomes smaller than the third reference amount B3. The condition for restarting the coding processing is to be such that the data amount D1 is smaller than the first reference amount B1 or that the data amount D2 is smaller than the second reference amount B2.

In the first to third embodiments, the description is given on the example where the data stream is exchanged via the USB controller 30 and the bus USB. The present invention is not to be limited to such embodiments. For example, the data stream may be exchanged via a PCI (Peripheral Component Interconnect) bus controller and a PCI bus.

In the first to third embodiments, the description is given on the example where the present invention is applied to the LSI on which the MPEG encoder ENC and the MPEG decoder DEC are both mounted. The present invention is not to be limited to such embodiments. For example, the present invention may be applied to an LSI exclusive for an MPEG encoder.

In the first to third embodiments, the description is given on the example where the system controller 10, the ROM 12, the RAM 14, the data conversion LSI 20, and the USB controller 30 are formed as individual chips. The present invention is not to be limited to such embodiments. For example, the system controller 10, the ROM 12, the RAM 14, the data conversion LSI 20, and the USB controller 30 may be formed as one chip.

The invention is not limited to the above embodiments and various modifications may be made without departing from the spirit and scope of the invention. Any improvement may be made in part or all of the components.

What is claimed is:

1. A data coding method comprising the steps of:
generating video coding data by coding video data according to a first standard;
writing the video coding data to a first buffer;
generating audio coding data by coding audio data according to a second standard;
writing the audio coding data to a second buffer;
generating multiplexed data by multiplexing at predetermined timing data read from the first buffer and data read from the second buffer according to a third standard;
writing the multiplexed data to a third buffer; and
outputting the written multiplexed data in response to an external request, wherein the method further comprising the steps of
generating multiplexed data only when it is judged that newly generated multiplexed data is writable to the third buffer;
suspending an audio coding processing and a video coding processing when at least one of the first to third buffers store(s) therein data of amount exceeding its/their respective set maximum amount(s); and
restarting the audio coding processing and the video coding processing when at least one of the first to third buffers store(s) therein data of amount below its/their respective reference amount(s) which is/are set to smaller value(s) than the set maximum amount(s).

2. The data coding method according to claim 1, wherein:
the first buffer has a capacity equal to or larger than a sum of its own set maximum amount and a maximum amount of data which is written to the first buffer during a period from when the audio coding processing and the video coding processing suspends to when the coding of the video data actually stops;
the second buffer has a capacity equal to or larger than a sum of its own set maximum amount and a maximum amount of data which is written to the second buffer during a period from when the audio coding processing and the video coding processing suspends to when the coding of the audio data actually stops; and
the third buffer has a capacity equal to or larger than a sum of its own set maximum amount and a maximum amount of data which is written to the third buffer during a period from when the audio coding processing and the video coding processing suspends to when the coding of the video data and the audio data actually stops.

3. The data coding method according to claim 1, wherein the first to third standards are an MPEG standard.

4. A data coding method comprising the steps of:
generating video coding data by coding video data according to a first standard;
writing the video coding data to a first buffer;
generating audio coding data by coding audio data according to a second standard;
writing the audio coding data to a second buffer;
generating multiplexed data by multiplexing at predetermined timing data read from the first buffer and data read from the second buffer according to a third standard; and
writing the multiplexed data to a third buffer; and
outputting the written multiplexed data in response to an external request, wherein the method further comprising the steps of
generating multiplexed data only when it is judged that newly generated multiplexed data is writable to the third buffer; and
overwriting unread multiplexed data in the third buffer with newly generated multiplexed data in sequence when the third buffer and at least either of the first and second buffers store therein data of amounts exceeding their respective set maximum amounts, the overwriting being done in such a manner that the older multiplexed data is, the earlier it is overwritten.

5. The data coding method according to claim 4, wherein the first to third standards are an MPEG standard.

6. A data coding method comprising the steps of:
generating video coding data by coding video data according to a first standard;
writing the video coding data to a first buffer;
generating audio coding data by coding audio data according to a second standard;
writing the audio coding data to a second buffer;
generating multiplexed data by multiplexing at predetermined timing data read from the first buffer and data read from the second buffer according to a third standard;

writing the multiplexed data to a third buffer; and
outputting the written multiplexed data in response to an external request, wherein the method further comprising the steps of:
generating multiplexed data only when it is judged that newly generated multiplexed data is writable to the third buffer;
overwriting unread video coding data in the first buffer with newly generated video coding data in sequence when the first and third buffers store therein data of amounts exceeding their respective set maximum amounts, the overwriting being done in such a manner that the older video coding data is, the earlier it is overwritten; and
overwriting unread audio coding data in the second buffer with newly generated audio coding data in sequence when the second and third buffers store therein data of amounts exceeding their respective set maximum amounts, the overwriting being done in such a manner that the older audio coding data is, the earlier it is overwritten.

7. The data coding method according to claim 6, further comprising the steps of:
erasing audio coding data in the second buffer corresponding to the overwritten video coding data at the time of the overwriting; and
erasing video coding data in the first buffer corresponding to the overwritten audio coding data at the time of the overwriting.

8. The data coding method according to claim 6, wherein the first to third standards are an MPEG standard.

9. A data coding device comprising:
a video encoder that codes video data according to a first standard to output the coded data as video coding data;
a first buffer to which the video coding data is written;
an audio encoder that codes audio data according to a second standard to output the coded data as audio coding data;
a second buffer to which the audio coding data is written;
a multiplexer that multiplexes at predetermined timing data read from the first buffer and data read from the second buffer according to a third standard and outputs the multiplexed data;
a third buffer to which the multiplexed data is written and that outputs the written multiplexed data in response to an external request; and
a controlling part that controls audio coding, video coding, and multiplexing, wherein:
the controlling part controls said multiplexer to generate multiplexed data only when it is judged that newly generated multiplexed data is writable to the third buffer;
the controlling part requests the video encoder and the audio encoder to suspend the audio coding and the video coding when at least one of the first to third buffers store(s) therein data of amount exceeding its/their respective set maximum amount(s); and
the controlling part requests the video encoder and the audio encoder to restart the audio coding and the video coding when at least one of the first to third buffers store(s) therein data of amount below its/their respective reference amount(s) which is/are set to smaller value(s) than the set maximum amount(s).

10. The data coding device according to claim 9, wherein:
the first buffer has a capacity equal to or larger than a sum of its own set maximum amount and a maximum amount of data which is written to the first buffer during a period from when the controlling part requests for the suspension of an audio coding processing and a video coding processing to when the coding of the video data actually stops;
the second buffer has a capacity equal to or larger than a sum of its own set maximum amount and a maximum amount of data which is written to the second buffer during a period from when the controlling part requests for the suspension of the audio coding processing and the video coding processing to when the coding of the audio data actually stops; and
the third buffer has a capacity equal to or larger than a sum of its own set maximum amount and a maximum amount of data which is written to the third buffer during a period from when the controlling part requests for the suspension of the audio coding processing and the video coding processing to when the coding of the video data and the audio data actually stops.

11. The data coding device according to claim 9, wherein the first to third standards are an MPEG standard.

12. A data coding device comprising:
a video encoder that codes video data according to a first standard to output the coded data as video coding data;
a first buffer to which the video coding data is written;
an audio encoder that codes audio data according to a second standard to output the coded data as audio coding data;
a second buffer to which the audio coding data is written;
a multiplexer that multiplexes at predetermined timing data read from the first buffer and data read from the second buffer according to a third standard and outputs the multiplexed data;
a third buffer to which the multiplexed data is written and that outputs the written multiplexed data in response to an external request; and
a controlling part that controls audio coding, video coding, and multiplexing, wherein
the controlling part controls said multiplexer to generate multiplexed data only when it is judged that newly generated multiplexed data is writable to the third buffer, and
the controlling part allows the multiplexer to overwrite unread multiplexed data in the third buffer with newly generated multiplexed data in sequence when the third buffer and at least one of the first and second buffers store therein data of amounts exceeding their respective set maximum amounts, the overwriting is done in such a manner that the older multiplexed data is, the earlier it is overwritten.

13. The data coding device according to claim 12, wherein the first to third standards are an MPEG standard.

14. A data coding device comprising:
a video encoder that codes video data according to a first standard to output the coded data as video coding data;
a first buffer to which the video coding data is written;
an audio encoder that codes audio data according to a second standard to output the coded data as audio coding data;
a second buffer to which the audio coding data is written;
a multiplexer that multiplexes at predetermined timing data read from the first buffer and data read from the second buffer according to a third standard and outputs the multiplexed data;
a third buffer to which the multiplexed data is written and that outputs the written multiplexed data in response to an external request; and a controlling part that controls audio coding, video coding, and multiplexing, wherein the controlling part controls said multiplexer to generate multiplexed data only when it is judged that newly generated multiplexed data is writable to the third buffer;

the controlling part allows the video encoder to overwrite unread video coding data in the first buffer with newly generated video coding data in sequence when the first and third buffers store therein data of amounts exceeding their respective set maximum amounts, the overwriting is done in such a manner that the older video coding data is, the earlier it is overwritten; and the controlling part allows the audio encoder to overwrite unread audio coding data in the second buffer with newly generated audio coding data in sequence when the second and third buffers store therein data of amounts exceeding their respective set maximum amounts, the overwriting is done in such a manner that the older audio coding data is, the earlier it is overwritten.

15. The data coding device according to claim 14, wherein:

at the time of the overwriting, the controlling part allows the video encoder to erase audio coding data in the second buffer corresponding to the overwritten video coding data; and at the time of the overwriting, the controlling part allows the audio encoder to erase video coding data in the first buffer corresponding to the overwritten audio coding data.

16. The data coding device according to claim 14, wherein the first to third standards are an MPEG standard.

* * * * *